US012380180B2

(12) United States Patent
Cai et al.

(10) Patent No.: US 12,380,180 B2
(45) Date of Patent: Aug. 5, 2025

(54) METHOD AND APPARATUS FOR FEW-SHOT RELATION CLASSIFICATION AND FILTERING, AND DEVICE

(71) Applicant: National University of Defense Technology, Hunan (CN)

(72) Inventors: Fei Cai, Hunan (CN); Peihong Li, Hunan (CN); Honghui Chen, Hunan (CN); Jianming Zheng, Hunan (CN); Taihua Shao, Hunan (CN); Mengru Wang, Hunan (CN); Siyuan Wang, Hunan (CN); Dengfeng Liu, Hunan (CN); Yanying Mao, Hunan (CN)

(73) Assignee: National University of Defense Technology, Changsha (CN)

( * ) Notice: Subject to any disclaimer, the term of this patent is extended or adjusted under 35 U.S.C. 154(b) by 0 days.

(21) Appl. No.: 18/815,286

(22) Filed: Aug. 26, 2024

(65) Prior Publication Data
US 2025/0068700 A1    Feb. 27, 2025

(30) Foreign Application Priority Data
Aug. 25, 2023    (CN) .......................... 202311083691.1

(51) Int. Cl.
*G06N 20/00*      (2019.01)
*G06F 18/2415*      (2023.01)

(52) U.S. Cl.
CPC ......... *G06F 18/2415* (2023.01); *G06N 20/00* (2019.01)

(58) Field of Classification Search
CPC ........................... G06N 20/00; G06F 18/2415
See application file for complete search history.

(56) References Cited

U.S. PATENT DOCUMENTS 12,086,539 B2 *    9/2024    Yin ..................... G06F 16/3344

OTHER PUBLICATIONS

Shih et al., Investigating Siamese LSTM Networks for Text Categorization, Proceedings of APSIPA Annual Summit and Conference 2017, Dec. 2017. (Year: 2017).*
Han et al., Meta-Learning Siamese Network for Few-Shot Text Classification, Mar. 2023. (Year: 2023).*
Muller et al., Few-Shot Learning with Siamese Networks and Label Tuning, Proceedings of the 60th Annual Meeting of the Association for Computational Linguistics, May 2022. (Year: 2022).*

* cited by examiner

*Primary Examiner* — Marshall L Werner

(57) ABSTRACT

A method and an apparatus for few-shot relation classification and filtering, and a device are provided. The method includes: constructing a coarse-grained filter for filtering an unlabeled corpus to obtain candidate instances with a same entity as a seed instance and with similar semantics to the seed instance; constructing a fine-grained filter for filtering the candidate instances to obtain a candidate instance with a same relation concept as the seed instance; defining the candidate instance as a positive instance set, and defining candidate instances with different relation concepts from the seed instance as a negative sample set; constructing a false positive instance correction module for adjusting and controlling a proportion of the negative sample set used by a classifier during training; training the classifier based on a small number of obtained labeled instances belonging to a newly emerging relation and the adjusted positive instance set and negative sample set.

3 Claims, 7 Drawing Sheets

METHOD AND APPARATUS FOR FEW-SHOT RELATION CLASSIFICATION AND FILTERING, AND DEVICE

CROSS-REFERENCE TO RELATED APPLICATION

This application claims priority from the Chinese patent application 2023110836911 filed Aug. 25, 2023, the content of which is incorporated herein in the entirety by reference.

TECHNICAL FIELD

Embodiments of the disclosure relates to the technical field of data filtering and classification, in particular to a method and an apparatus for few-shot relation classification and filtering, and a device.

BACKGROUND

In recent years, information technology and Internet have experienced explosive development, and there are unstructured texts containing a lot of information on the Internet. Information extraction (IE) involves extracting valuable knowledge from these texts, including named entity recognition, event detection (ED), relation classification (RC) and the like. In these tasks, the relation classification aims at detecting a relation between a pair of entities contained in a sentence, which has great practical value in reality, such as providing input for many downstream applications (a knowledge graph or a question answering system). As shown in FIG. 1, a sentence S1 contains two entities, namely, a head entity "expressway" and a tail entity "river". An object of relation classification is to determine whether there is a "cross" relation between above two entities. Because of its considerable commercial value, the relation classification has become one of the most prominent research topics in information extraction. However, effectiveness of data-driven relation classification methods is limited due to scarcity of annotation instances, especially for emerging relations with only a few instances.

Therefore, in existing methods, performance of a few-shot data classification model is mainly improved from two aspects, that is, increasing quantity and quality of annotations. In order to increase a quantity of instances, many researchers choose to use semi-supervised learning and distant supervision. In the distant supervision, entity alignment is used to automatically and continuously mark unlabeled instances from external databases. However, with a strong relation hypothesis in the distant supervision of "if two sentences contain a same instance, then they represent a same relation", much noise is often introduced to a model. Therefore, a neural snowball algorithm is proposed in an existing scheme, which is a distant supervision method. In order to solve a noise problem, it adopts a Relation Siamese Network (RSN) to measure distances between query instances and a supporting seed instance so as to determine whether they have a same relation. In addition, prompt learning has gained extensive attention in improving quality of instances. Templates in prompt learning can be used to store rich semantics and stimulate common knowledge of a pre-training language model (PLM), making it an excellent performer of few-shot learning tasks. Many prompt-based methods have been proposed, such as PRBOOST, PTR and PAIE. However, these methods only focus on characteristics of individual sentences at local levels, such as entity pairs, while ignoring rich information of conceptual semantics at a global level. Excessive dependence on a single piece of information may cause semantic deviation, which may hinder overall comprehensive and accurate understanding of semantics of a relation, especially under settings of few-shot learning.

SUMMARY

A problem to be solved in the disclosure is to provide a method and an apparatus for few-shot relation classification and filtering and a device, which can address shortage of few-shot training data and improve few-shot recognition accuracy.

In order to solve the above problem, a method for few-shot relation classification and filtering is provided in the disclosure, which includes:
  constructing a coarse-grained filter, the coarse-grained filter being configured for filtering an unlabeled corpus to obtain a first candidate instance with a same entity as a seed instance and a second candidate instance with similar semantics to the seed instance;
  constructing a fine-grained filter, the fine-grained filter being configured for filtering the first candidate instance and the second candidate instance to obtain a third candidate instance with a same relation concept as the seed instance;
  defining the third candidate instance as a positive instance set, and defining a candidate instance among the first candidate instance and the second candidate instance with a different relation concept from the seed instance as a negative sample set, the relation concept being configured for describing a relation between different instances;
  constructing a false positive instance correction module, the false positive instance correction module being configured for adjusting and controlling a proportion of the negative sample set used by a classifier during training;
  training the classifier based on a small number of obtained labeled instances belonging to a newly emerging relation and the positive instance set and the negative sample set adjusted by the false positive instance correction module; and
  performing relational classification on few-shot data based on the trained classifier.

As an alternative embodiment, the constructing the coarse-grained filter includes:
  providing an entity alignment module, which is configured for identifying the first candidate instance in the corpus with the same entity as the seed instance;
  providing a relation siamese network, which is configured for filtering out the second candidate instance with similar semantics to the seed instance by measuring distances between instances in the corpus and a word vector in the seed instance; and
  forming the coarse-grained filter based on the entity alignment module and the relation siamese network.

As an alternative embodiment, there are a plurality of seed instances, and the filtering out the second candidate instance with similar semantics to the seed instance by measuring distances between instances in the corpus and the word vector in the seed instance includes:
  determining a similarity score between two instances by measuring Euclidean distances between the instances in the corpus and the word vector in the seed instance by the relation siamese network;

$$S_{RSN}(x_s^i, x_u^i) = \sigma(w_p(f_p(x_s^i) - f_p(x_u^i))^2 + b_p)$$

calculating an average similarity score based on similarity scores between respective instances in the corpus and respective seed instances; and filtering out the second candidate instance with similar semantics to the respective seed instances based on a plurality of the average similarity scores;

in which $\sigma(\cdot)$ is a sigmoid activation function, $f_p(\cdot)$ is used to encode a sentence vector, and a range of $S_{RSN}(\cdot)$ is from 0 to 1, a weight $w_p$ and deviation $b_p$ are trainable parameters, $x_s^i$ is the seed instance in the corpus.

As an alternative embodiment, the constructing the fine-grained filter includes:

providing a prompt template generation function, which is configured for respectively converting the first candidate instance and the second candidate instance into a new text meeting requirements of an input template, the input template containing text description in the candidate instance, a relation concept and a label column, and the label column being configured to be added with a label indicating whether the relation concept of the candidate instance is consistent with the relation concept of the seed instance; and using a pre-training language model for processing the new text corresponding to the first candidate instance and the second candidate instance according to the relation concept of the seed instance, so as to add a label matching the new texts to the label column based on a processing result, and filtering the first candidate instance and the second candidate instance according to the label so as to obtain the third candidate instance.

As an alternative embodiment, the method further includes:

pre-training the coarse-grained filter, the fine-grained filter and the classifier respectively based on obtained labeled instances that meet frequently occurring relations;

filtering the corpus based on the pre-trained coarse-grained filter and fine-grained filter to obtain the positive instance set and the negative sample set; and training the pre-trained classifier based on the positive instance set, the negative sample set and the small number of labeled instances belonging to the newly emerging relation.

As an alternative embodiment, the pre-training the coarse-grained filter, the fine-grained filter and the classifier respectively based on obtained labeled instances that meet frequently occurring relations includes:

pre-training the coarse-grained filter based on any two of the labeled instances that meet frequently occurring relations, combined with a cross entropy loss;

constructing different input templates, and pre-training the fine-grained filter based on the different input templates and the labeled instances that meet frequently occurring relations, the input templates containing template format content, the text descriptions in candidate instances, the relation concept and the label column, and the label column being configured to be added with the label indicating whether the relation concept of the candidate instance is consistent with the relation concept of the seed instance; and pre-training the classifier based on a few-shot learning mode and the labeled instances that meet frequently occurring relations.

As an alternative embodiment, the constructing the different input templates includes:

constructing an input template with text description and a relation concept at different positions, an input template which is absence of part or all of template format content, and an input template which forms a negative template by changing a relation concept.

As an alternative embodiment, the method further includes:

correcting parameters of the classifier and a loss function by the false positive instance correction module to be:

$$\mathcal{L}_{B_{pos}, B_{neg}}(\mathcal{G}_w, B) = \sum_{x \in B_{pos}} \log(\mathcal{G}_w, B_{neg}(x)) + \mu \sum_{x \in B_{neg}} \log(1 - \mathcal{G}_w, B_{neg}(x)),$$

in which $B_{pos}$ represents a batch of positive instances, $B_{neg}$ represents a batch of negative examples in the negative sample set, $\mathcal{G}_w$ is a classifier, and $\mu$ a negative sampling loss coefficient, which is used to control a proportion of negative examples used by the classifier during training.

An apparatus for few-shot relation classification and filtering is further provided in another embodiment of the present, which includes:

a first construction module configured for constructing a coarse-grained filter, the coarse-grained filter being configured for filtering an unlabeled corpus to obtain a first candidate instance with a same entity as a seed instance and a second candidate instance with similar semantics to the seed instance;

a second construction module configured for constructing a fine-grained filter, the fine-grained filter being configured for filtering the first candidate instance and the second candidate instance to obtain a third candidate instance with a same relation concept as the seed instance;

a definition module configured for defining the third candidate instance as a positive instance set, and defining a candidate instance among the first candidate instance and the second candidate instance with a different relation concept from the seed instance as a negative sample set, the relation concept being configured for describing a relation between different instances;

a third construction module configured for constructing a false positive instance correction module, the false positive instance correction module being configured for adjusting and controlling a proportion of the negative sample set used by a classifier during training;

a training module configured for training the classifier based on a small number of obtained labeled instances belonging to a newly emerging relation and the positive instance set and the negative sample set adjusted by the false positive instance correction module; and a classification module configured for performing relational classification on few-shot data based on the trained classifier.

An electronic device is further provided in another embodiment of the present disclosure, which includes:

at least one processor; and a memory communicatively connected with the at least one processor; wherein The memory stores instructions executable by the at least one processor, and the instructions are executed by the at least one processor to realize the method for few-shot filtering and classification as described in any of above embodiments.

It can be known based on disclosure of the above embodiments that the embodiments of the disclosure have beneficial effects that high-quality instances are captured from the corpus by adopting a coarse-grained and fine-grained double-layer filter, the training data is expanded, training accuracy of the classifier is improved, and the noise problem which occurs in existing semi-supervised learning is avoided. In addition, in the method of this embodiment, the classifier is facilitated to understand the relation between the input text and the seed instance by changing the input text into a new text that meets the requirements of the input template, thereby improving accuracy of the classifier in few-shot relation classification. Moreover, in order to improve ability of the input template to identify non-attribution relation between instances, different input templates, including the negative template and the positive template with different contents, are also introduced in a pre-training stage of the fine-grained filter in the method of this embodiment. In addition, in order to alleviate an over-fitting problem in a classifier training process, a false positive instance correction module is also added to dynamically adjust the proportion of negative sample sets participating in the training in the method of this embodiment, thereby reducing over-fitting damage of positive instances to classifier performance.

Other features and advantages of the disclosure will be set forth in the description in the following, and in part will be obvious from the description, or may be learned by implementation of the disclosure. Objects and other advantages of the present disclosure can be realized and obtained by structures particularly pointed out in the written specification and claims, as well as the appended drawings.

Technical schemes of the disclosure will be further described in detail through the attached drawings and embodiments.

BRIEF DESCRIPTION OF THE DRAWINGS

The accompanying drawings are provided to provide a further understanding of the disclosure and constitute a part of the specification, which, together with the embodiments of the disclosure, serve to explain the disclosure and do not constitute limitation on the disclosure. In the drawings.

DETAILED DESCRIPTION

I Hereinafter, specific embodiments of the present disclosure will be described in detail with reference to the attached drawings, which are not taken as limitation on the present disclosure.

It should be understood that various modifications can be made to the embodiments disclosed herein. Therefore, following description should not be regarded as limitation, but only as examples of embodiments. Other modifications within the scope and spirit of the present disclosure will occur to those skilled in the art.

The accompanying drawings, which are included in and constitute a part of the specification, illustrate embodiments of the disclosure, and together with general description of the disclosure given above and the detailed description of the embodiments given below, serve to explain the principles of the disclosure.

These and other features of the present disclosure will become apparent from the following description of preferred forms of embodiments given as non-limiting examples with reference to the accompanying drawings.

It should also be understood that although the disclosure has been described with reference to some specific examples, many other equivalent forms of the disclosure can be definitely realized by those skilled in the art, which have features as claimed and therefore are all within the scope of protection defined thereby.

The above and other aspects, features and advantages of the present disclosure will become more apparent in view of the following detailed description when taken in conjunction with the accompanying drawings.

Hereinafter, specific embodiments of the present disclosure will be described with reference to the accompanying drawings. However, it should be understood that the disclosed embodiments are only examples of the present disclosure, which can be implemented in various ways. Well-known and/or repetitive functions and structures have not been described in detail to avoid obscuring this disclosure with unnecessary or redundant details. Therefore, specific structural and functional details disclosed herein are not intended to be limiting, but only as a basis and a representative basis of the claims for teaching those skilled in the art to variously use the disclosure in virtually any suitable detailed structure.

Phrases "in an embodiment", "in another embodiment", "in yet another embodiment" or "in other embodiments" can be used in this specification, which can all refer to one or more of same or different embodiments according to the present disclosure.

Hereinafter, embodiments of the present disclosure will be described in detail with reference to the attached drawings.

Figure 1:
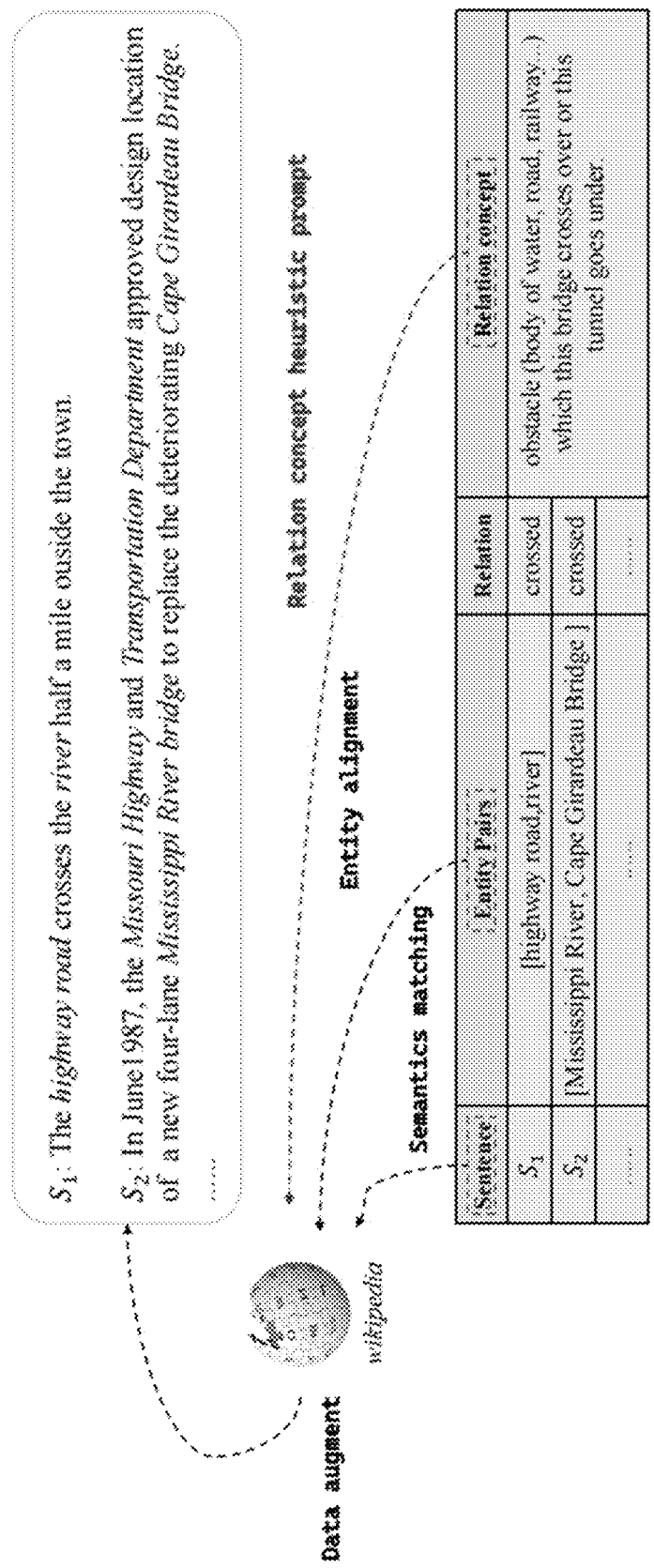
FIG. 1 is a schematic diagram of an example of relation classification.
Figure 2:
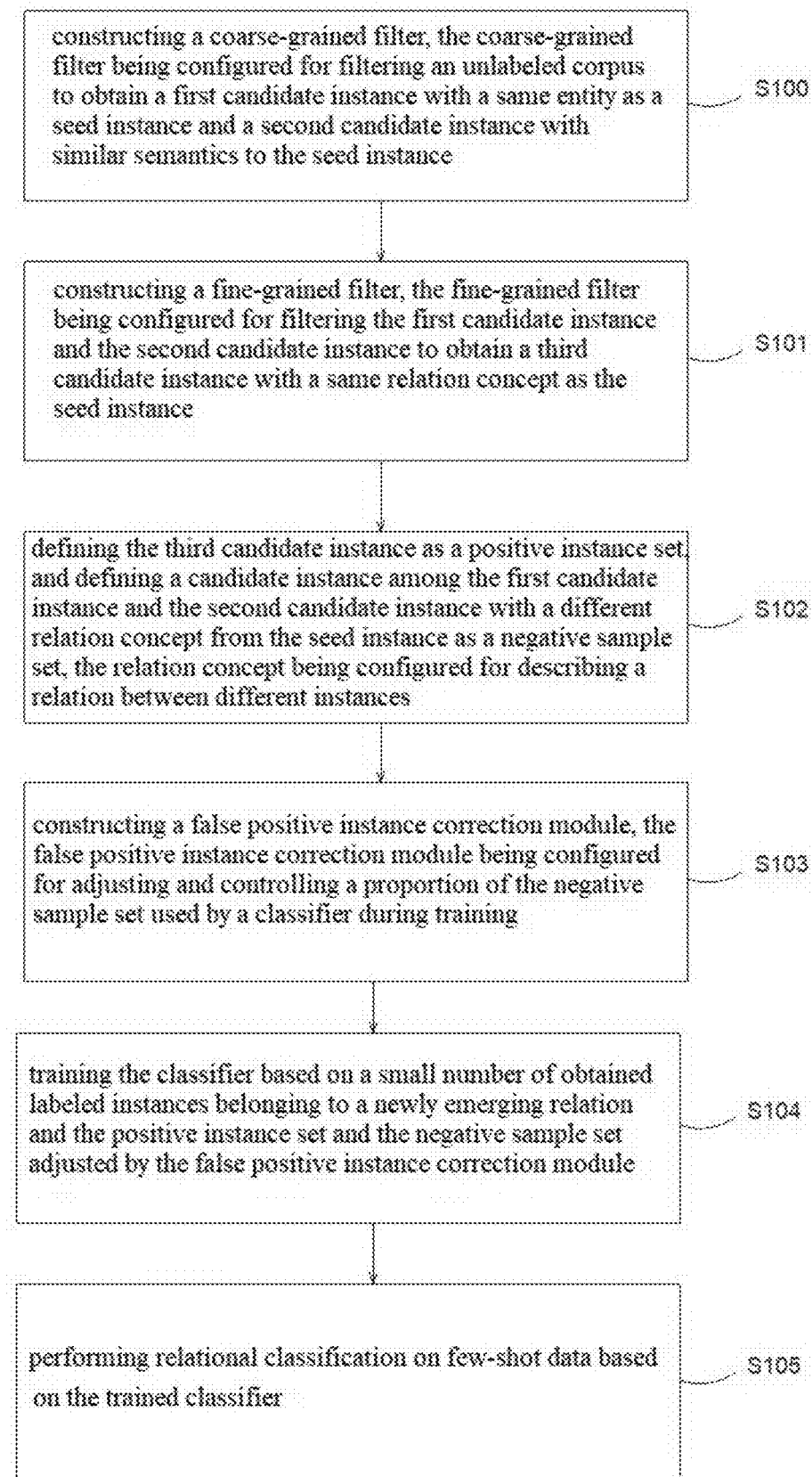
FIG. 2 is a flowchart of a method for few-shot filtering and classification in an embodiment of the present disclosure.

As shown in FIG. 1, a method for few-shot relation classification and filtering is provided an embodiment of the present disclosure, which includes following steps S100 to S105.

In step S100, a coarse-grained filter is constructed. The coarse-grained filter is configured for filtering an unlabeled corpus to obtain a first candidate instance with a same entity as a seed instance and a second candidate instance with similar semantics to the seed instance.

In step S101, a fine-grained filter is constructed, and the fine-grained filter is configured for filtering the first candidate instance and the second candidate instance to obtain a third candidate instance with a same relation concept as the seed instance.

In step S102, the third candidate instance is defined as a positive instance set, and a candidate instance among the first candidate instance and the second candidate instance with a different relation concept from the seed instance is defined as a negative sample set, and the relation concept is configured for describing a relation between different instances.

In step S103, a false positive instance correction module is constructed, and the false positive instance correction module is configured for adjusting and controlling a proportion of the negative sample set used by a classifier during training.

In step S104, a classifier is trained based on a small number of labeled instances belonging to newly emerging relations, and the positive instance set and the negative sample set adjusted by the false positive instance correction module.

In step S105, relational classification is performed on few-shot data based on the trained classifier.

It can be known based on disclosure of the above embodiments that the method in the embodiments of the disclosure has beneficial effects that high-quality instances are captured from the corpus by adopting a coarse-grained and fine-grained double-layer filter, the training data is expanded, training accuracy of the classifier is improved, and the noise problem which occurs in existing semi-supervised learning is avoided. In addition, in order to alleviate a over-fitting problem in a classifier training process, a false positive instance correction module is also added to dynamically adjust the proportion of negative sample sets participating in the training in the method of this embodiment, thereby reducing over-fitting damage of positive instances to classifier performance.

With the method disclosed in this embodiment, the classifier can still have high-precision classification effect under a condition of low resources, and a recall rate and a F1 value (namely, F1-score, which is a measure of a classification problem, and is a harmonic average of an accuracy rate and the recall rate) has also been obviously improved relative to a baseline, thus truly realizing that the classifier can think like a human being, overcoming limitation related to local information in the input data, and realizing that the classifier can learn text semantics and carry out high-accuracy relation classification regardless of a length of an input text sequence, a number of seed instances, or interference from false positive instances.

Further, main distribution characteristics of existing relational classification data are as follows: 1) a certain number of labeled instances $D_{pre}$ belonging to frequently occurring relations; 2) a small number of labeled instances $D_n$ belonging to newly emerging relations; 3) a large number of unlabeled corpus/bases $D_u$. The method in this embodiment combines a semi-supervised few-shot learning method and makes full use of above three types of data to realize training of the classifier. Generally, the method in this embodiment includes two stages. The first stage involves data enhancement. For example, a series of seed instances are extracted from $D_n$, including entity pairs $[e_h, e_t]$, relation labels $r_s$ and relation concepts $c_s$. Next, all unlabeled instances $x_u \in D_u$ may be compared with the seed instances through a pre-defined matching rule. If these unlabeled instances meet requirements, they will be selected and sent to the model to train the classifier (symbols $\mathcal{G}_w$ at other positions are also classifiers). In addition, a prompt template generation function is further designed in this embodiment, as shown below:

$$f_T(x_u, c_s, [Mask]) \rightarrow T(x_u)$$

in which the template $T(x_u)$ contains a relation concept $c_s$, an input text $x_u$ (text description in the candidate instance) and a special label [Mask] (tag), and the label in [Mask] representing a relation between instances is a standard to decide whether the instance should be labeled, that is, whether the candidate instance has a same relation concept with the seed instance. The second stage involves a testing process of a new relation. Different from traditional few-shot relation classification, the method according to this embodiment is to test input texts from $D_n$, $D_u$ and $D_{pre}$ and their corresponding entity pairs. The model aims to classify an unlabeled instance into a new relation label, specifically as follows:

$$\mathcal{G}_x(x, e_h, e_t) \rightarrow y_n \in \mathcal{Y}_n$$

in which $\mathcal{Y}_n$ represents a set of all involved relation labels.

Figure 3:
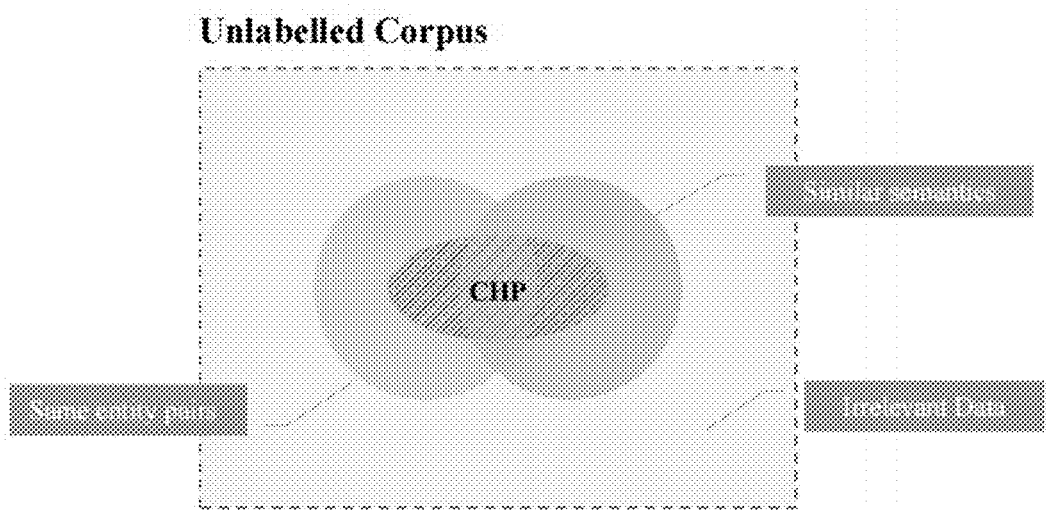
FIG. 3 shows data distribution obtained in an unlabeled corpus without label in the embodiment of the present disclosure.

As shown in FIG. 3, a rectangular box represents an unlabeled corpus (unlabeled corpus base); a circle on the left represents a positive instance identified by the coarse-grained filter—the first candidate instance; a circle on the right marks a positive instance identified by the coarse-grained filter—the second candidate instance. While a shadow overlapping part passing through the two circles represents a true positive instance identified by the fine-grained filter—the third candidate instance. However, an object of the classifier model in this embodiment is to obtain as many instances marked by the shadow overlapping part from the unlabeled corpus as possible.

Specifically, the classifier in this embodiment is with a snowball structure as a model framework to identify matched relation instances from an external unlabeled corpus. When a method process in this embodiment is executed, it is firstly necessary to construct the coarse-grained filter, which includes following step S106 to S108.

In step S106, an entity alignment module is provided, which is configured for identifying the first candidate instance in the corpus with the same entity as the seed instance.

In step S107, a relation siamese network is provided, which is configured for filtering out the second candidate instance with similar semantics to the seed instance by measuring distances between instances in the corpus and a word vector in the seed instance.

In step S108, the coarse-grained filter is formed based on the entity alignment module and the relation siamese network.

Figure 4:
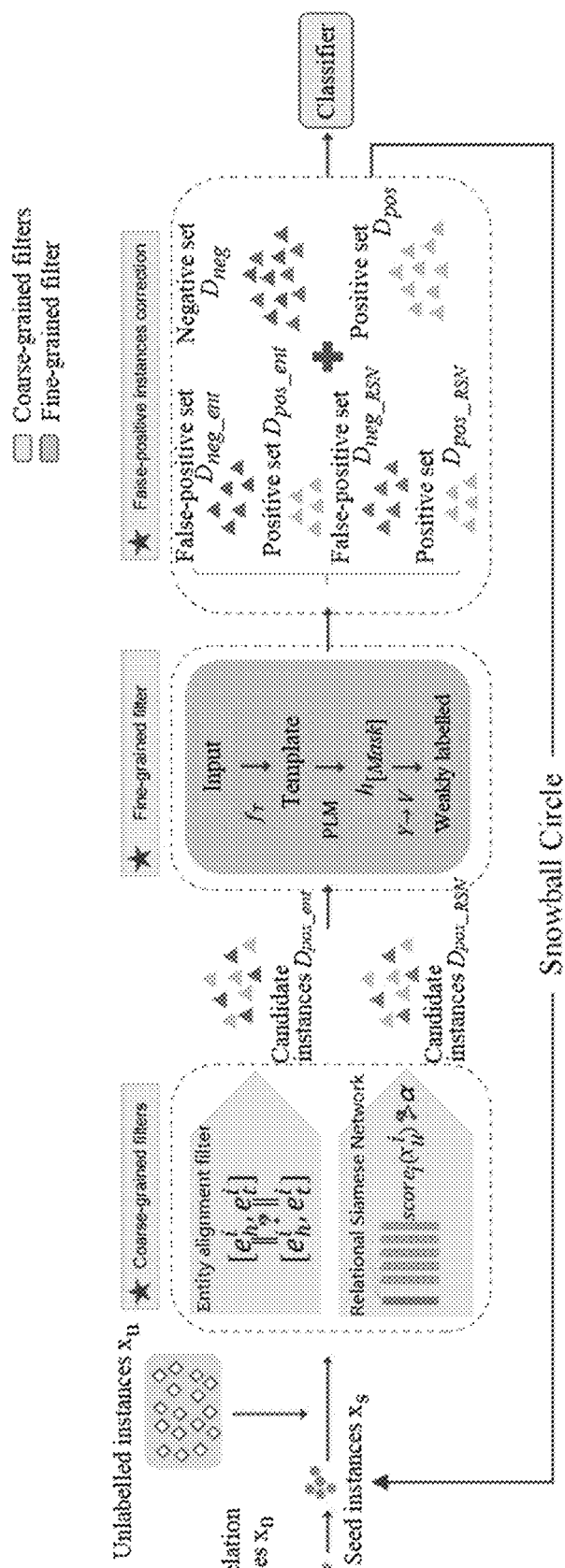
FIG. 4 is a workflow diagram of a coarse-grained to fine-grained filter model in an embodiment of the present disclosure.

For example, as shown in FIG. 4, a coarse-grained snowballing workflow is performed by the coarse-grained filter performs, which includes the entity alignment module and the relation siamese network (RSN module for short). The coarse-grained filter can serve to randomly select several seed instances $x_s^i$ from $D_n$ to form a seed instance set $D_s$, with each instance corresponding to a relation $r_s \in R_n$ and a relation concept $c_s \in C_n$, and at the same time to form an entity pair set $E_s$, and then each input instance (input sentence) $x_u^i$ in $D_u$ is compared with $x_s^i$ in the entity alignment module and RSN module respectively.

Specifically, the coarse-grained filter uses the entity alignment module to identify an input instance $x_u^i$ which shares a same entity with the seed instance, and this process can be described as follows:

$$\mathcal{D}_{pos\_ent} = \{x_{pos\_ent}^i | \varepsilon_{pos\_ent}(e_h, e_t) = E_{align}(x_s^i, x_u^i)\}$$

in which, $e_h$ and $e_t$ are an entity pair of $x_s^i$. $E_{align}(\cdot)$ determines whether the entity pair between $x_s^i$ and $x_u^i$ matches or not. $\varepsilon_{pos\_ent}(\cdot)$ refers to a set of matched entity pairs. Then, an $x_{pos\_ent}^i$ satisfying $E_{align}$ may be added to the candidate instance set $D_{pos\text{-}ent}$, that is, the first candidate instance is formed.

However, as a coarse-grained filter in nature, the entity alignment module often serves to extract an instance that share an entity with $x_s^i$ but expresses different relations, that is, noise data can be filtered out. For example, a sentence #1 "Bill Gates founded Microsoft" and a sentence #2 "Bill Gates announced his departure from Microsoft" share a same entity pair, namely "Bill Gates" and "Microsoft", but the two entities in different sentences involves different relations, namely "founded" and "departure". Therefore, a positive instance (the first candidate instance) obtained at this stage may be sent to the CHP (fine-grained filter) for further filtering.

Through filtering of the entity alignment module, some instances with new relations have been collected from the corpus. However, an instance with a different entity pair from that in x but representing a same relation is still missed in the above-described process, such as "Bill Gates founded Microsoft" and "Jobs founded Apple". In fact, there are many such instances in practical applications.

Therefore, the relation siamese network (hereinafter referred to as RSN) is used in this embodiment to capture such missed instances. As can be seen from the above, there are a plurality of seed instances. In this embodiment, the RSN serves to filter out the second candidate instance with similar semantics to the seed instance by measuring distances between instances in the corpus and the word vector in the seed instance, which includes following steps S109 to S111.

In step S109, a similarity score between two instances is determined by measuring Euclidean distances between the instances in the corpus and the word vector in the seed instance by the relation siamese network:

$$S_{RSN}(x_s^i, x_u^i) = \sigma(w_p(f_p(x_s^i) - f_p(x_u^i))^2 + b_p)$$

In step S110, an average similarity score is calculated based on similarity scores between respective instances in the corpus and respective seed instances.

In step S111, the second candidate instance with similar semantics to the respective seed instances is filtered out based on a plurality of the average similarity scores.

in which $\sigma(\cdot)$ is a sigmoid activation function, $f_p(\cdot)$ is used to encode a sentence vector, and a range of $S_{RSN}(\cdot)$ is from 0 to 1, a weight $w_p$ and deviation $b_p$ are trainable parameters, $x_s^i$ is the seed instance in the corpus.

Specifically, the RSN in this embodiment is equivalent to functioning in calculating the distance between the seed instance x and the query instance $x_u^i$ (the instance in the corpus) to determine a probability at which they share the same relation:

$$S_{RSN}(x_s^i, x_u^i) = \sigma(w_p(f_p(x_s^i) - f_p(x_u^i))^2 + b_p)$$

The greater the calculated similarity score (probability), the greater possibility that the two instances express the same relation. After the similarity score is obtained, an average score of the query instance to respective seed instances can be calculated as:

$$score_i(x_u^i) = \frac{\sum_1^n S_{RSN}^j(x_s^i, x_u^i)}{n}$$

in which n is a number of seed instances. Optionally, in this embodiment, first K instances $x_{pos\_RSN}^i$ ranked from high to low in score are selected as the positive instance data set $D_{pos-RSN}$, that is, second candidate instances. It is also possible to set a threshold of the RSN, such as 0.5, so as to filter and obtain the second candidate instances based on the threshold and a plurality of average similarity scores. The second candidate instances are also not all accurate positive instances, that is, instances with a same entity pair and similar semantics at the same time, which also need to be filtered again through the fine-grained filter.

Further, the fine-grained filter in this embodiment is formed based on a concept of concept heuristic prompt (CHP), and its inspiration comes from logical reasoning when human beings understand new concepts. For example, for a sentence "Nick founded a welfare school to teach children to learn science", people always focus on a word "founded" instead of entities (vocabulary) such as "Nick" and "welfare school". Therefore, a meaning of a relation of "founding" is crucial. Inspired by this concept, in this embodiment, a fine-grained filter is constructed, which includes following steps S112 and S113.

In step S112, a prompt template generation function is provided, which is configured for respectively converting the first candidate instance and the second candidate instance into a new text meeting requirements of an input template, the input template contains text description in the candidate instance, a relation concept and a label column, and the label column is configured to be added with a label indicating whether the relation concept of the candidate instance is consistent with the relation concept of the seed instance.

In step S113, a pre-training language model is used for processing the new text corresponding to the first candidate instance and the second candidate instance according to the relation concept of the seed instance, so as to add a label matching the new texts to the label column based on a processing result, and filtering the first candidate instance and the second candidate instance according to the label so as to obtain the third candidate instance.

Figure 5:
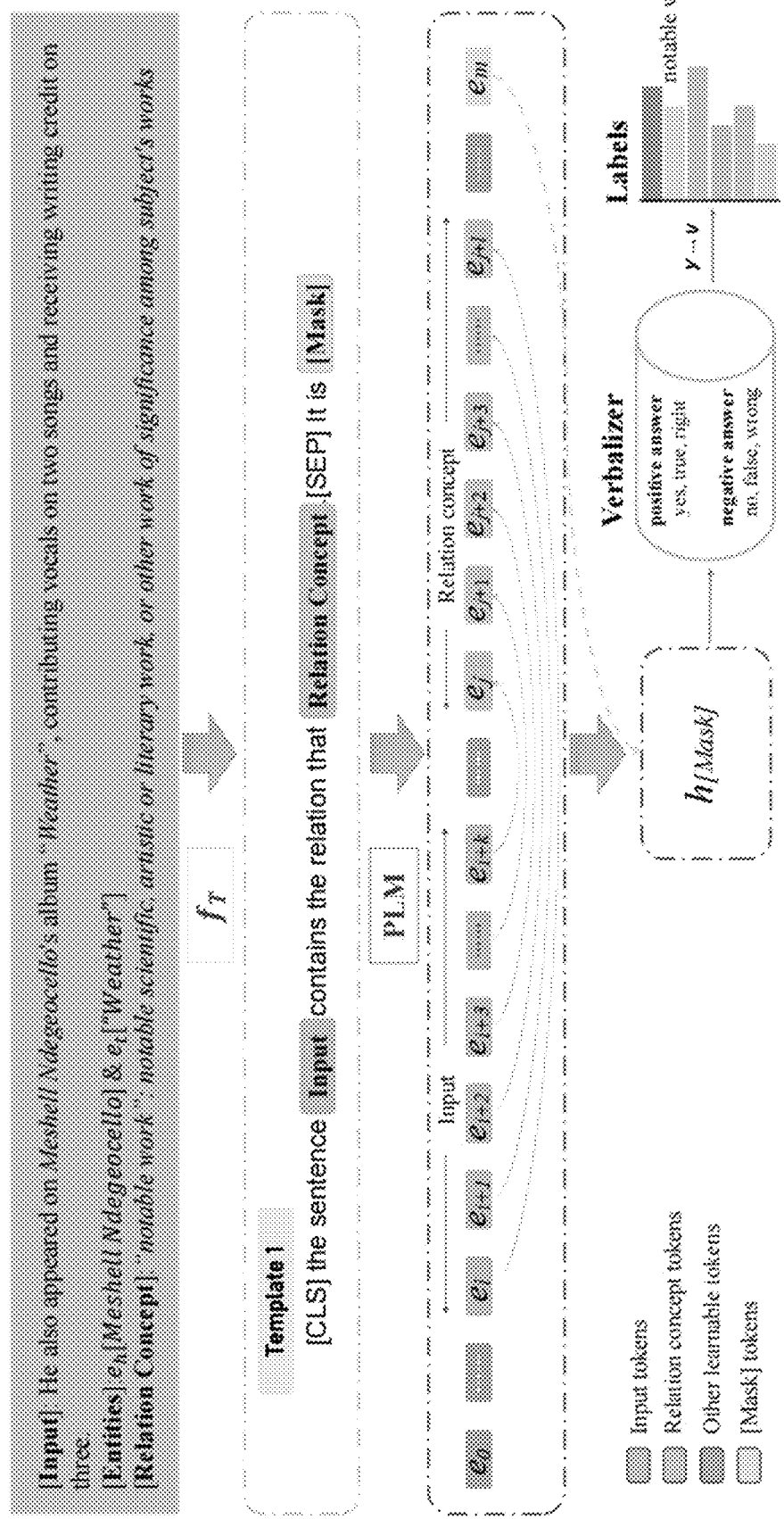
FIG. 5 is a working process diagram of a fine-grained filter in an embodiment of the present disclosure.

Specifically, the set prompt template generation function $f_T$ can be used to transform the candidate instance extracted by the coarse-grained filter into the new text that meets the requirements of the input template, that is, it contains the text description of the candidate embodiment, the relation concept and the label column, and then the new text is processed by using the pre-training language model (PLM) to obtain the label that represents whether the current candidate instance and the seed instance have a same relation concept. Reference can be made to FIG. 5 for a specific process. A process of the template generation function $f_T$, with a given input x, converting the input into a new text containing the relation concept, and then sending the relation concept to the PLM so as to obtain a hidden embedding of the [Mask] label is described in FIG. 5.

For the first candidate instance $x_{pos\_ent}^i$ in $D_{pos-ent}$ obtained by the entity alignment module in, given a seed relation concept $c_s^i$ and a seed label $r_s^i$, the input template (new text) is constructed as follows:

$$T_{pos\_ent}^i(x_{pos\_ent}^i) = f_T(x_{pos\_ent}^i, c_s^i, [Mask])$$

Then the new text is entered into the PLM to fill in an answer for obtaining [Mask] and determine whether $x_{pos\_ent}^i$ indicates the relation $r_s$. For instances that are considered to constitute this relation, they can be labeled as weakly positive and then attached to the accurate positive instance set $D_{pos}$. The above instances must satisfy following conditions:

$$\mathcal{F}_{ent} = \{x^i_{pos\_ent}|\mathcal{E}_{pos\_ent}(e_h, e_t) \neq \emptyset\}$$

$$\mathcal{F}_{CHP} = \{x^i_{pos\_CHP}|p([\text{Mask}] = \varphi(y^i_u)|T^i_u(x^i_u)) \gg \theta\}$$

$$\mathcal{D}_{pos} = \{x^i_{pos}|(\mathcal{F}_{ent} \wedge \mathcal{F}_{CHP})\}$$

The above equations show that [Mask] marked as h[Mask] is a label that can be mapped to the seed relation $r_s^i$. With regard to false positive instances, they can be attached to the negative sample set $D_{neg}$ as follows:

$$\mathcal{D}_{neg} = \{x^i_{neg}|(\mathcal{F}_{ent} \wedge (\neg \mathcal{F}_{CHP}))\}$$

in which ($\neg F_{CHP}$) indicates that a filtering condition of the fine-grained filter CHP is not satisfied. With the above process, reliable and high-quality positive instances (accurate positive instances) can be collected from an external unlabeled corpus to increase annotation data (training data). Meanwhile, the identified induced instances with high error rate are aggregated to form the negative sample set, which can enhance robustness of the model and realize fine-grained filtering when training the classifier in combination with this negative sample set.

Further, similar to the above process, the filtered second candidate instance $D_{pos\text{-}RSN}$ is input into the CHP filter and finally given a weak label. Then, based on filtering results, the second candidates instance are divided into a positive instance set $D_{pos}$ (the third candidate instance) and a negative sample set $D_{neg}$. As follows:

$$\mathcal{F}_{RSN} = \{x^i_{pos\_RSN}|(score_i(x^i_u) \gg \alpha)\}$$

$$\mathcal{F}_{CHP} = \{x^i_{pos\_CHP}|p([\text{Mask}] = \varphi(y^i_u)|T^i_u(x^i_u)) \gg \theta\}$$

$$\mathcal{D}_{pos} = \{x^i_{pos}|(\mathcal{F}_{ent} \wedge \mathcal{F}_{CHP}) \cup (\mathcal{F}_{RSN} \wedge \mathcal{F}_{CHP})\}$$

$$\mathcal{D}_{neg} = \{x^i_{neg}|(\mathcal{F}_{ent} \wedge (\neg \mathcal{F}_{CHP})) \cup (\mathcal{F}_{RSN} \wedge (\neg \mathcal{F}_{CHP}))\}$$

First two equations represent filtration conditions of the RSN and the CHP respectively. With the above method process, data at the shadow overlapping part in FIG. 3 can be collected to maximum extent. Because the input template described above is realized based on the heuristic relation concept, based on this input template, the fine-grained filter can fully learn the semantic relation between the label and the input text under a condition of low resources, effectively identify false positive instances, and further effectively stimulate rich knowledge hidden in the PLM.

Figure 6:
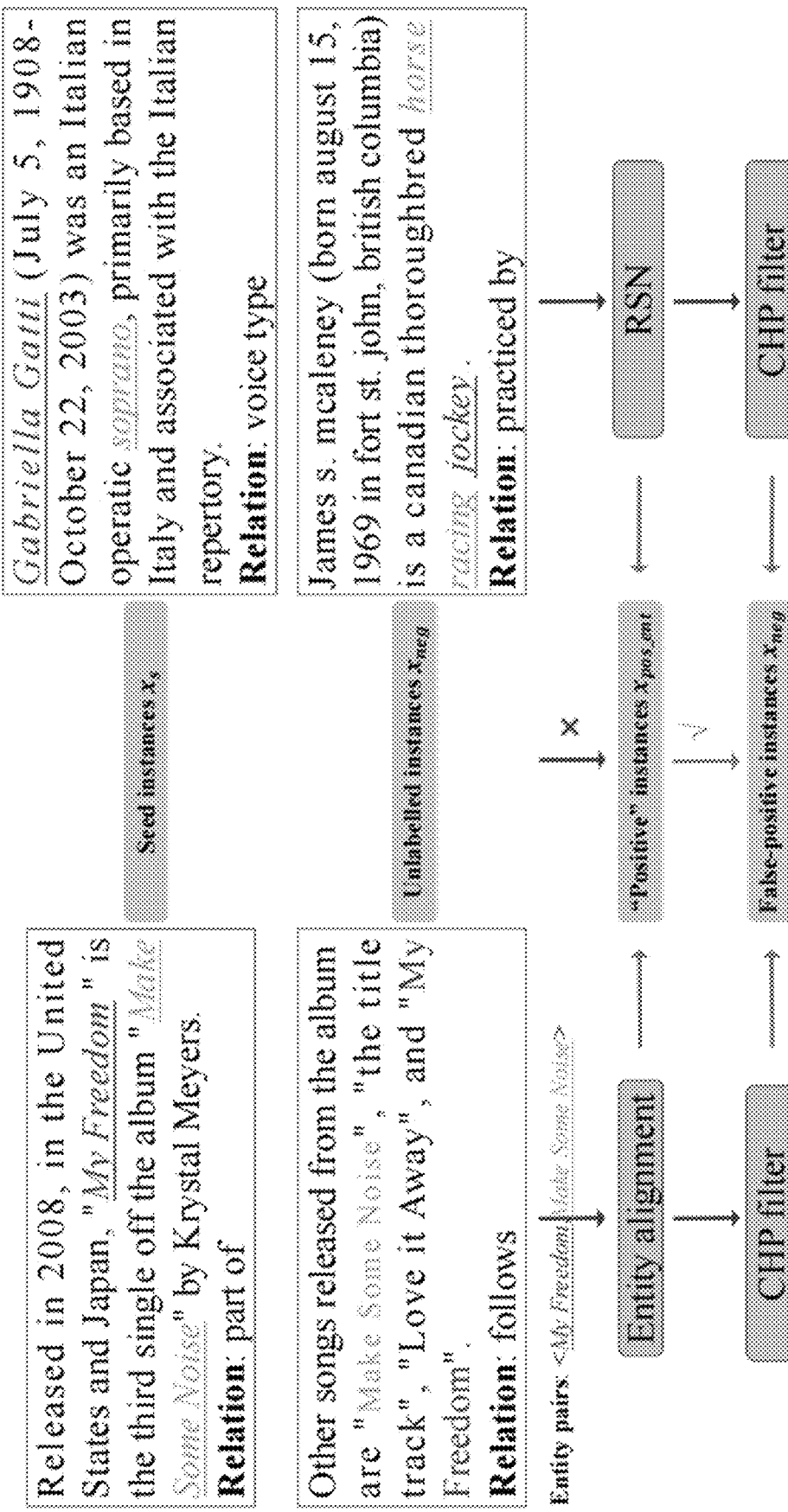
FIG. 6 is a process diagram of a fine-grained filter (CHP) to filter and identify false positive instances.

For example, as an instance, referring to FIG. 6, a case where an instance meets an entity alignment standard but does not meet a conceptual heuristic prompt standard is described in a left pane. As can be seen from the figure, the seed instance and the unlabeled instances have a same entity pair of "My Freedom, Make some noise", but represent different relations. In the seed instance, a relation of the entity pair is "part of", which indicates that "My Freedom" is a song in an album "Make some noise". On the contrary, in unlabeled instances, their relation is "follows", which indicates that "My Freedom" is located after the song "Make some noise".

A right pane in FIG. 6 shows that the RSN misclassifies two instances belonging to different relations. According to a principle of the RSN, this error classification is due to comparability of structures of these two sentences, which both express person's professional attributes, while the input template formed based on the conceptual heuristic prompt can assist the filter in classifying them correctly. Therefore, introduction of the conceptual heuristic prompt can not only help the filter identify the real positive instances, but also detect the false positive instances, which is very important to correct classification ability of the model.

Further, in another embodiment, the method further includes following steps S114 to S116.

In step S114, the coarse-grained filter, the fine-grained filter and the classifier are pre-trained respectively based on obtained labeled instances that meet frequently occurring relations.

In step S115, the corpus is filtered based on the pre-trained coarse-grained filter and fine-grained filter to obtain the positive instance set and the negative sample set.

In step S116, the pre-trained classifier is trained based on the positive instance set, the negative sample set and the small number of labeled instances belonging to the newly emerging relation.

A step in which the coarse-grained filter, the fine-grained filter and the classifier are pre-trained respectively based on the obtained labeled instances that meet frequently occurring relations includes following step S117 to S119.

In step S117, the coarse-grained filter is pre-trained based on any two of the labeled instances that meet frequently occurring relations, combined with a cross entropy loss.

In step S118, different input templates are constructed, and the fine-grained filter is pre-trained based on the different input templates and the labeled instances that meet frequently occurring relations, the input templates contains template format content, the text descriptions in candidate instances, the relation concept and the label column, and the label column is configured to be added with the label indicating whether the relation concept of the candidate instance is consistent with the relation concept of the seed instance.

In step S119, the classifier is pre-trained based on a few-shot learning mode and the labeled instances that meet frequently occurring relations.

A step in which different input templates are constructed includes step S120.

In step S120, an input template with text description and a relation concept at different positions, an input template which is absence of part or all of template format content, and an input template which forms a negative template by changing a relation concept are constructed.

For example, in order to enable the classifier to better migrate instances to the newly emerging relation, it is proposed in this embodiment to pre-train the RSN module, the classifier $\mathcal{G}_w$ and the CHP filter on a large number of existing relations $D_{pre}$. For $\mathcal{G}_w$, it is pre-trained by a traditional N-way K-shot mode in this embodiment. For RSN, two sentences are randomly selected from $D_{pre}$, and then the cross entropy loss is used to train in this embodiment. For the CHP filter, three positive templates and one negative template are provided for training to improve its performance in this embodiment.

Specifically, three positive prompt templates $T^i(\cdot)$, i=1, 2 and 3 are provided in this embodiment, and training is performed on a large number of existing relations $R_{pre}$. For example, given an input text $x_{pre}^i \in D_{pre}$ and its relation $r_{pre}{}^i \in R_{pre}$, a relation concept prompt template is established with the relation concept $c_{pre}{}^i \in C_{pre}$ as follows:

The template includes description of the input text, the relation concept, the tab column and the template format content, such as in a following table:

---

Input xpre: $x_{pre}{}^i$: He also appeared in an album "Weather" by Meshell Ndegeocello, as a lead singer for two songs and composing three songs.
Relation $r_{pre}{}^i$: "Famous Works"
Relation concept $c_{pre}{}^i$: famous scientific, artistic or literary works, or other important works in a main work.
$T_1$: this sentence [input $x_{pre}{}^i$] contains this relation [relation $r_{pre}{}^i$]]. This statement is [Mask].
$T_2$: this relation [relation $r_{pre}{}^i$]] exists in this sentence [input $x_{pre}{}^i$]. This statement is [Mask].
$T_3$: [input $x_{pre}{}^i$] [relation $r_{pre}{}^i$]]. This statement is [Mask].
$T_+$: this sentence [input $x_{pre}{}^i$] contains this relation [relation $r_{pre}{}^i$]]. This statement is [Mask].
$T_-$: this sentence [input $x_{pre}{}^i$] contains this relation [relation $r_{pre}{}^i$]. This statement is [Mask].

---

"this sentence [ ] contains this relation [ ]. This statement is [ ]" is the template format content. Format content of first three templates are different, and filling positions of input texts and relation concepts in $T_1$ and $T_2$ are also different. This setting is to explore influence of the input texts and the relation concepts at different positions on the fine-grained filter. Setting of the template $T_3$ is to explore whether the template needs extra words beyond key semantics, such as whether the template format content is needed. Continuing with what is shown in FIG. 5, by inputting the template $T_{pre}{}^i$ ($c_{pre}{}^i$) into the PLM, a hidden vector h[Mask] of v can be obtained, and in view of embedding of a token $v \in V$, a probability of v filling in a [Mask] position can be calculated:

$$p_{pre}^i([\text{Mask}] = v | T_{pre}^i(x_{pre}^i)) = \frac{\exp(e_v \cdot h_{[Mask]})}{\sum_{v' \in V} \exp(e_{v'} \cdot h_{[Mask]})}$$

It is desired that the fine-grained filter can answer with a word such as "yes", "correct" or "right", indicating that the input sentence contains this seed relation, and it can also be considered as having a same relation concept as the seed instance. Contrariwise, if v[mask] is "no", "wrong" or "false", it indicates there is no relation. Then, vectors of these words can be mapped to corresponding relations:

$$p_{pre}^i(y_{pre}^i | x_{pre}^i) = p([\text{Mask}] = \varphi(y_{pre}^i) | T_{pre}^i(x_{pre}^i))$$

in which $\varphi(\cdot)$ is a label mapping function $\varphi: Y \to V$, Y is a true value. However, semantic deviation may be introduced if only positive instances are constructed for each relation. These instances provide little benefit and compromises the model. In order to improve robustness of the model, positive and negative templates are also fabricated for each relation $r_i$ in pre-training the fine-grained filter in this embodiment, that is, last two templates in the above table, so to correct semantic tilt caused by too many positive templates. In the negative template, the relation concept is changed from $r_{pre}{}^i$ to $c_{pre}{}^j$, and provision of this negative template is mainly configured to determine whether an instance does not belong to a specified relation. This ability is very important for transplanting the fine-grained filter into a filter network in the future, because most unlabeled samples do not belong to a relation to be determined. As pointed out before, if the negative template is not provided, overall performance of the model will be greatly degraded. Through training of above different templates, a final learning goal-loss function can be minimized for the fine-grained filter:

$$\mathcal{L} = \frac{1}{N_x} \sum_i -[y_i^+ \cdot \log(p_i^+) + y_i^- \cdot \log(p_i^-)]$$

in which L the cross entropy loss; and $N_x$ is a number of a batch of input instances. In addition, classification of each relation can be set as a binary classification task in training to improve efficiency of the model and facilitate addition of new relation types at the same time.

Preferably, a coarse-to-fine filter described above produces a large number of high-quality weak labeled instances, namely, the positive instance set and the negative sample set. However, if the classifier is trained only using the positive instances, extreme imbalance between a number of the positive instances and a number of the negative samples may be caused. This imbalance may cause the classifier to have higher recall and lower accuracy. In order to solve this problem, the false positive instance correction module is proposed in the model in this embodiment, and the false positive instances are used to correct inclination of the classifier during training, thus alleviating the over-fitting problem caused by too many positive instances.

For example, for a seed relation $r_s^i$, a batch of positive instances $B_{pos}$ and a batch of negative samples in a negative sample set can be extracted. Then, these instances are combined with $D_n$ to train the classifier. Parameters of the classifier and a loss function can be corrected by this false positive instance correction module to be:

$$\mathcal{L}_{B_{pos}, B_{neg}}(\mathcal{G}_w, B) = \sum_{x \in B_{pos}} \log(\mathcal{G}_w, B_{neg}(x)) + \mu \sum_{x \in B_{neg}} \log(1 - \mathcal{G}_w, B_{neg}(x)),$$

in which $\mathcal{G}_w$ is the classifier, μ is a negative sampling loss coefficient, that is, a super parameter, which can be taken with a value of 0.5 or other values, indicates an input scale of the false positive instances, and is used to control a proportion of the negative instances used by the classifier during training.

Optionally, in this embodiment, the device and application programs involved in executing the above method process include following content. Few-shot instance data is encoded by BERT (a language representation model), and this experiment is carried out using a window11 system on pycharm software (an integrated development environment)

with torch3.8 (an open source machine learning library) and NVIDIA GTX 3060 GPU. There are many ways to acquire text data in the corpus, such as network collection, artificial directional collection and so on.

Figure 7:
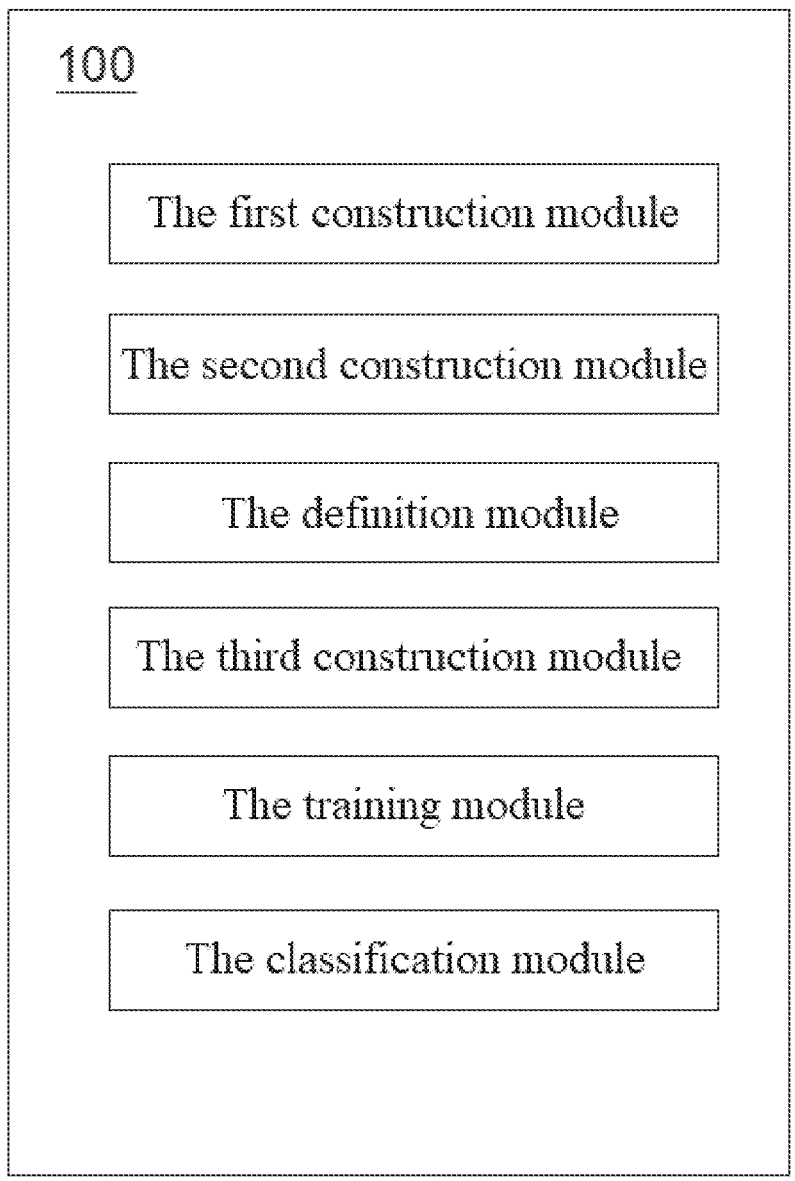
FIG. 7 is a structural block diagram of an apparatus for few-shot filtering and classification in an embodiment of the present disclosure.

As shown in FIG. 7, an apparatus 100 for few-shot relation classification and filtering is further provided in another embodiment of the present, which includes:

a first construction module configured for constructing a coarse-grained filter, the coarse-grained filter being configured for filtering an unlabeled corpus to obtain a first candidate instance with a same entity as a seed instance and a second candidate instance with similar semantics to the seed instance;

a second construction module configured for constructing a fine-grained filter, the fine-grained filter being configured for filtering the first candidate instance and the second candidate instance to obtain a third candidate instance with a same relation concept as the seed instance;

a definition module configured for defining the third candidate instance as a positive instance set, and defining a candidate instance among the first candidate instance and the second candidate instance with a different relation concept from the seed instance as a negative sample set, the relation concept being configured for describing a relation between different instances;

a third construction module configured for constructing a false positive instance correction module, the false positive instance correction module being configured for adjusting and controlling a proportion of the negative sample set used by a classifier during training;

a training module configured for training the classifier based on a small number of obtained labeled instances belonging to a newly emerging relation and the positive instance set and the negative sample set adjusted by the false positive instance correction module; and a classification module configured for performing relational classification on few-shot data based on the trained classifier.

As an alternative embodiment, the constructing the coarse-grained filter includes:

providing an entity alignment module, which is configured for identifying the first candidate instance in the corpus with the same entity as the seed instance;

providing a relation siamese network, which is configured for filtering out the second candidate instance with similar semantics to the seed instance by measuring distances between instances in the corpus and a word vector in the seed instance; and forming the coarse-grained filter based on the entity alignment module and the relation siamese network.

As an alternative embodiment, there are a plurality of seed instances, and the filtering out the second candidate instance with similar semantics to the seed instance by measuring distances between instances in the corpus and the word vector in the seed instance includes:

determining a similarity score between two instances by measuring Euclidean distances between the instances in the corpus and the word vector in the seed instance by the relation siamese network;

$$S_{RSN}(x_s^i, x_u^i) = \sigma(w_p(f_p(x_s^i) - f_p(x_u^i))^2 + b_p)$$

calculating an average similarity score based on similarity scores between respective instances in the corpus and respective seed instances; and filtering out the second candidate instance with similar semantics to the respective seed instances based on a plurality of the average similarity scores;

in which $\sigma(\cdot)$ is a sigmoid activation function, $f_p(\cdot)$ is used to encode a sentence vector, and a range of $S_{RSN}(\cdot)$ is from 0 to 1, a weight $w_p$ and deviation $b_p$ are trainable parameters, $x_s^i$ is the seed instance in the corpus.

As an alternative embodiment, the constructing the fine-grained filter includes:

providing a prompt template generation function, which is configured for respectively converting the first candidate instance and the second candidate instance into a new text meeting requirements of an input template, the input template containing text description in the candidate instance, a relation concept and a label column, and the label column being configured to be added with a label indicating whether the relation concept of the candidate instance is consistent with the relation concept of the seed instance; and using a pre-training language model for processing the new text corresponding to the first candidate instance and the second candidate instance according to the relation concept of the seed instance, so as to add a label matching the new texts to the label column based on a processing result, and filtering the first candidate instance and the second candidate instance according to the label so as to obtain the third candidate instance.

As an alternative embodiment, the apparatus further includes:

a pre-training model configured for pre-training the coarse-grained filter, the fine-grained filter and the classifier respectively based on obtained labeled instances that meet frequently occurring relations; and a filtering module configured for filtering the corpus based on the pre-trained coarse-grained filter and fine-grained filter to obtain the positive instance set and the negative sample set.

The training module is configured for training the pre-trained classifier according to the positive instance set, the negative sample set and the small number of labeled instances belonging to the newly emerging relation.

As an alternative embodiment, the pre-training the coarse-grained filter, the fine-grained filter and the classifier respectively based on obtained labeled instances that meet frequently occurring relations includes:

pre-training the coarse-grained filter based on any two of the labeled instances that meet frequently occurring relations, combined with a cross entropy loss;

constructing different input templates, and pre-training the fine-grained filter based on the different input templates and the labeled instances that meet frequently occurring relations, the input templates containing template format content, the text descriptions in candidate instances, the relation concept and the label column, and the label column being configured to be added with the label indicating whether the relation concept of the candidate instance is consistent with the relation concept of the seed instance; and pre-training the classifier based on a few-shot learning mode and the labeled instances that meet frequently occurring relations.

As an alternative embodiment, the constructing the different input templates includes:
constructing an input template with text description and a relation concept at different positions, an input template which is absence of part or all of template format content, and an input template which forms a negative template by changing a relation concept.

As an alternative embodiment, the apparatus further includes:
a correction module configured for correcting parameters of the classifier and a loss function according to the false positive instance correction module to be:

$$\mathcal{L}_{B_{pos}, B_{neg}}(\mathcal{G}_w, B) = \sum_{x \in B_{pos}} \log(\mathcal{G}_w, B_{neg}(x)) + \mu \sum_{x \in B_{neg}} \log(1 - \mathcal{G}_w, B_{neg}(x)),$$

in which $B_{pos}$ represents a batch of positive instances, $B_{neg}$ represents a batch of negative examples in the negative sample set, $\mathcal{G}_w$ is a classifier, and $\mu$ a negative sampling loss coefficient, which is used to control a proportion of negative examples used by the classifier during training.

An electronic device is further provided in another embodiment of the present disclosure, which includes:
at least one processor; and
a memory communicatively connected with the at least one processor.

The memory stores instructions executable by the at least one processor, and the instructions are executed by the at least one processor to realize the method for few-shot classification and filtering as described in any of above embodiments.

Further, a storage medium is further provided in an embodiment of the present disclosure, on which a computer program is stored. The computer program, when executed by a processor, realizes the method for few-shot classification and filtering as described above. It should be understood that various schemes in this embodiment have corresponding technical effects to the method embodiments described above, which will not be repeatedly described here again.

Further, a computer program product is further provided in an embodiment of the present disclosure, which is tangibly stored on a computer-readable medium and includes computer-readable instructions, which, when executed, cause the at least one processor to perform the method for few-shot classification and filtering such as in the embodiments described above.

It should be noted that the computer storage medium of the present disclosure can be a computer-readable signal medium or a computer-readable storage medium or any combination of the above two. The computer-readable medium can be, for example, but not limited to, an electronic, magnetic, optical, electromagnetic, infrared, or semiconductor system or device, or any combination of the above. More specific examples of the computer-readable storage media may include, but are not limited to, electrical connections with one or more wires, portable computer disks, hard disks, random access memories (RAMs), read-only memories (ROMs), erasable programmable read-only memories (EPROMs or flash memories), optical fibers, portable compact disk read-only memories (CD-ROMs), optical storage devices, magnetic storage devices, or any suitable combination of the above. In this disclosure, the computer-readable storage medium can be any tangible medium containing or storing a program, which can be used by or in combination with an instruction execution system, apparatus or device. In this disclosure, the computer-readable signal medium may include a data signal propagated in baseband or as a part of a carrier wave in which the computer-readable program code is carried. This propagated data signal can take various forms, including but not limited to an electromagnetic signal, an optical signal or any suitable combination of the above. A computer-readable signal medium can also be any computer-readable medium other than a computer-readable storage medium, which can send, propagate or transmit a program configured for being used by or in connection with an instruction execution system, apparatus or device. The program code contained in the computer readable medium can be transmitted with any suitable medium, including but not limited to wirelessly, an antenna, a fiber optic cable, RF, etc., or any suitable combination of the above.

It should be understood by those skilled in the art that embodiments of the present disclosure may be provided as a method, a system, or a computer program product. Therefore, the present disclosure may be implemented in an entire hardware embodiment, an entire software embodiment, or an embodiment combining the software and the hardware. Furthermore, the present disclosure may be implemented in a form of a computer program product embodied on one or more computer usable storage media (including but not limited to a disk memory and an optical memory, etc.) having computer usable program code contained therein.

The present disclosure is described with reference to a flowchart and/or block diagram of a method, a device (system), and a computer program product according to the present disclosure. It should be understood that each flow and/or block in the flowchart and/or block diagram, or a combination of flows and/or blocks in the flowchart and/or block diagram can be implemented with computer program instructions. These computer program instructions can be provided to a processor of a general purpose computer, a special purpose computer, an embedded processor or other programmable data processing device to produce a machine, so that the instructions executed by the processor of the computer or other programmable data processing device produce systems for implementing the functions specified in one or more flows in the flowchart and/or in one or more blocks in block diagram.

These computer program instructions can also be stored in a computer-readable memory that can guide a computer or other programmable data processing device to work in a specific way, so that the instructions stored in the computer-readable memory produce an article of manufacture including instruction systems that implement the functions specified in one or more flows in the flowchart and/or in one or more blocks in the block diagram.

These computer program instructions can also be loaded on a computer or other programmable data processing device, so that a series of operation steps are executed on the computer or other programmable device to produce computer-implemented processing, so that the instructions executed on the computer or other programmable device provide steps for implementing functions specified in one or more flows in the flowchart and/or in one or more blocks in block diagrams.

Obviously, various modifications and variations can be made by those skilled in the art without departing from the spirit and scope of the disclosure. Thus, it is intended that the present disclosure include these modifications and variations provided that they are within the scope of the claims and their equivalents.

The above embodiments are only exemplary embodiments of the present disclosure, and are not intended to limit the present disclosure. The scope of protection of the present disclosure is defined by the claims. Various modifications or equivalent substitutions can be made by those skilled in the art within the spirit and protection scope of the disclosure, and such modifications or equivalent substitutions should also be considered as falling within the scope of protection of the disclosure.

What is claimed is:

1. A method for few-shot relation classification and filtering, comprising, executed by a processor:
constructing a coarse-grained filter, the coarse-grained filter being configured for filtering an unlabeled corpus to obtain a first candidate instance with a same entity as a seed instance and a second candidate instance with semantics to the seed instance;
constructing a fine-grained filter, the fine-grained filter being configured for filtering the first candidate instance and the second candidate instance to obtain a third candidate instance with a same relation concept as the seed instance;
pre-training the coarse-grained filter, the fine-grained filter and the classifier respectively based on obtained labeled instances that meet occurring relations;
filtering the corpus based on the pre-trained coarse-grained filter and fine-grained filter to obtain the positive instance set and the negative sample set;
training the pre-trained classifier based on the positive instance set, the negative sample set and the small number of labeled instances belonging to the newly emerging relation;
defining the third candidate instance as a positive instance set, and defining a candidate instance among the first candidate instance and the second candidate instance with a different relation concept from the seed instance as a negative sample set, the relation concept being configured for describing a relation between different instances;
constructing a false positive instance correction module, the false positive instance correction module, executed on the processor, being configured for adjusting and controlling a proportion of the negative sample set used by a classifier during training;
training the classifier based on a number of obtained labeled instances belonging to a newly emerging relation and the positive instance set and the negative sample set adjusted by the false positive instance correction module; and
performing relational classification on few-shot data based on the trained classifier, wherein the constructing the coarse-grained filter comprises:
providing an entity alignment module, executed on the processor, which is configured for identifying the first candidate instance in the corpus with the same entity as the seed instance;
providing a relation siamese network, which is configured for filtering out the second candidate instance with similar semantics to the seed instance by measuring distances between instances in the corpus and a word vector in the seed instance; and
forming the coarse-grained filter based on the entity alignment module and the relation siamese network;
wherein there are a plurality of seed instances, and the filtering out the second candidate instance with similar semantics to the seed instance by measuring distances between instances in the corpus and the word vector in the seed instance comprises:
determining a similarity score between two instances by measuring Euclidean distances between the instances in the corpus and the word vector in the seed instance by the relation siamese network;

$$S_{RSN}(x_s^i, x_u^i) = \sigma(w_p(f_p(x_s^i) - f_p(x_u^i))^2 + b_p)$$

calculating an average similarity score based on similarity scores between respective instances in the corpus and respective seed instances; and
filtering out the second candidate instance with similar semantics to the respective seed instances based on a plurality of the average similarity scores;
wherein $\sigma(\cdot)$ is a sigmoid activation function, $f_p(\cdot)$ is used to encode a sentence vector, and a range of $S_{RSN}(\cdot)$ is from 0 to 1, a weight $w_p$ and deviation $b_p$ are trainable parameters, $x_s^i$ is the seed instance in the corpus; and
wherein the classifier is facilitated to understand a relation between an input text and the seed instance by changing the input text into a new text that meets the requirements of an input template, thereby improving accuracy of the classifier in few-shot relation classification, and the classifier has a classification effect under a condition of resources, and a recall rate and a F1 value (namely, F1-score, which is a measure of a classification problem, and is a harmonic average of an accuracy rate and the recall rate) has also been improved relative to a baseline, thus overcoming limitation related to information in the input data, and realizing that the classifier is able to learn text semantics and carry out relation classification regardless of a length of an input text sequence, a number of seed instances, or interference from false positive instances, thus addressing shortage of few-shot training data and improving few-shot recognition accuracy;
wherein the pre-training the coarse-grained filter, the fine-grained filter and the classifier respectively based on obtained labeled instances that meet occurring relations comprises:
pre-training the coarse-grained filter based on any two of the labeled instances that meet occurring relations, combined with a cross entropy loss;
constructing different input templates, and pre-training the fine-grained filter based on the different input templates and the labeled instances that meet occurring relations, the input templates containing template format content, the text descriptions in candidate instances, the relation concept and the label column; and
pre-training the classifier based on a few-shot learning mode and the labeled instances that meet occurring relations;
wherein the constructing the different input templates comprises:
constructing an input template with text description and a relation concept at different positions, an input template which is absence of part or all of template format content, and an input template which forms a negative template by changing a relation concept;

correcting parameters of the classifier and a loss function by the false positive instance correction module to be:

$$\mathcal{L}_{B_{pos},B_{neg}}(\mathcal{G}_w, B) = \sum_{x \in B_{pos}} \log(\mathcal{G}_w, B_{neg}(x)) + \mu \sum_{x \in B_{neg}} \log(1 - \mathcal{G}_w, B_{neg}(x))$$

where $B_{pos}$ represents a batch of positive instances, $B_{neg}$ represents a batch of negative examples in the negative sample set, $\mathcal{G}_w$ is a classifier, and u a negative sampling loss coefficient, which is used to control a proportion of negative examples used by the classifier during training, through training of above different templates, a final learning goal-loss function is minimized for the fine-grained filter.

2. The method for few-shot relation classification and filtering according to claim 1, wherein the constructing the fine-grained filter comprises:

providing a prompt template generation function, which is configured for respectively converting the first candidate instance and the second candidate instance into a new text meeting requirements of an input template, the input template containing text description in the candidate instance, a relation concept and a label column; and using a pre-training language model for processing the new text corresponding to the first candidate instance and the second candidate instance according to the relation concept of the seed instance, so as to add a label matching the new texts to the label column based on a processing result, and filtering the first candidate instance and the second candidate instance according to the label so as to obtain the third candidate instance.

3. An electronic device, comprising:

at least one processor; and a memory communicatively connected with the at least one processor; wherein the memory stores instructions executable by the at least one processor, and the instructions are executed by the at least one processor to realize the method for few-shot filtering and classification according to claim 1.

\* \* \* \* \*